United States Patent
Avery

(10) Patent No.: US 8,639,406 B2
(45) Date of Patent: Jan. 28, 2014

(54) SWITCH CONTROLLED BATTERY CHARGING AND POWERING SYSTEM FOR ELECTRIC VEHICLES

(76) Inventor: Michael Avery, Pembroke, GA (US)

( * ) Notice: Subject to any disclaimer, the term of this patent is extended or adjusted under 35 U.S.C. 154(b) by 0 days.

(21) Appl. No.: 13/465,856

(22) Filed: May 7, 2012

(65) Prior Publication Data

US 2012/0323421 A1    Dec. 20, 2012

Related U.S. Application Data

(60) Provisional application No. 61/482,915, filed on May 5, 2011.

(51) Int. Cl.
*B60L 11/00*    (2006.01)

(52) U.S. Cl.
USPC .......................................... 701/22; 180/65.1

(58) Field of Classification Search
USPC ................ 705/22; 180/65.1, 65.21, 65.29; 320/137–138, 149, 152, 157, 162; 903/906–907

See application file for complete search history.

(56) References Cited

U.S. PATENT DOCUMENTS

| | | | |
|---|---|---|---|
| 2002/0003417 A1* | 1/2002 | Bito et al. | 320/152 |
| 2009/0107743 A1* | 4/2009 | Alston et al. | 180/65.21 |

* cited by examiner

*Primary Examiner* — Mary Cheung
(74) *Attorney, Agent, or Firm* — Charlena Thorpe, Esq.; The Law Office of Charlena Thorpe, Inc.

(57) ABSTRACT

Methods and apparatuses for operating an electric vehicle using switch controlled battery charging and powering systems are provided. The apparatuses and methods disclosed herein include a first and second battery pack that are alternatively recharged multiple times and alternatively power the electric motor using a first and second switch. In some implementations, the battery packs are charged using a generator operatively connected to a wheel axle or the shaft of the vehicle's motor.

9 Claims, 6 Drawing Sheets

SWITCH CONTROLLED BATTERY CHARGING AND POWERING SYSTEM FOR ELECTRIC VEHICLES

CROSS REFERENCE TO RELATED APPLICATION

This application claims the benefit of U.S. Provisional Application Ser. No. 61/482,915, which was filed on May 5, 2011, and is incorporated herein by reference in its entirety.

TECHNICAL FIELD

This disclosure relates to a switch controlled battery charging and powering system for electric vehicles.

BACKGROUND

Some electric vehicles use rechargeable batteries, electric motors, and motor controllers for propulsion. Some electric vehicles can only be driven a limited distance (e.g., between 40 to 100 miles) due to the low amount of energy that can be stored in the rechargeable batteries. The range of an electric vehicle can depend not only on the type of batteries used but also the weight of the vehicle, among other things. Once the batteries are discharged, they must be recharged before the electric vehicle can be used again. However, the battery recharge time can be relatively long (e.g., up to 6 to 8 hours). In typical use, the rechargeable batteries of an electric vehicle are charged overnight or any other time that the electric vehicle is not in use for a long period of time. Electric vehicles typically charge from conventional power outlets or charging stations.

U.S. Pat. No. 6,456,040 discloses a purported method of extending the battery life of rechargeable batteries used in electric vehicles. The '040 patent discloses that to preserve good battery life, it is essential to allow the recharging batteries used in electric vehicles to fully discharge and enter a deep discharge state before recharging. Accordingly, the '040 patent discloses the use of at least two battery banks. Instead of charging a partially discharged battery bank overnight each night in the traditional way, the '040 patent discloses using at least two battery banks. The first battery bank is used to power the vehicle until it has fully discharged while the second bank (i.e., the standby battery bank), which has been charged in the traditional way, is on standby to power the vehicle when the first battery bank becomes fully discharged. When the first battery bank fully discharges, the second bank then is used to power the vehicle and the first bank then is charged overnight in the traditional way.

The '040 patent discloses that the fully charged standby battery bank may need a "trickle charge" to maintain its fully charged status since charge may dissipate over time with certain battery types. Thus, the '040 patent also discloses a regenerative charging system for providing transient recharging of the standby battery bank only when the vehicle is braking or coasting (i.e., when the accelerator pedal is not engaged). The regenerative charging system using two generators, which are connected to the rim of a wheel of the vehicle via a belt and pulley system. The wheel also has a motor attached to it that drives the wheel.

The vehicle disclosed in the '040 patent may not be suitable for long range driving (i.e., driving beyond the cumulative range for each battery bank used in the vehicle) because the system only provides transient or regenerative charging of the batteries. Thus, once the standby battery bank is discharged the car is inoperative until recharged in the traditional manner. The transient recharging only during breaking and coasting is not sufficient to recharge a battery for continued driving.

Furthermore, the vehicle disclosed in the '040 patent appears to be inefficient. For example, the vehicle has four motors, one attached to each wheel of the vehicle, for driving the four wheels of the vehicle, respectively. Furthermore, the regenerative recharging system, which includes two generators, a belt, and a V-belt drive wheel pulley, is connected to the rim of one of wheel. Thus, the vehicle includes a number of components that can add to the weight to the vehicle thereby reducing the range of the batteries and increasing the cost of the vehicle.

As another example, the belt and V-belt drive wheel pulley adds friction to the system thereby reducing the efficiency of the recharging system. Still further, having the recharging system attached to the rim of one of the wheels may reduce the efficiency of the generator. Moreover, having the recharging system attached to the rim of one of the wheels can create a driving hazard if a generator was to engage at medium to high speeds (e.g., greater than 20 mph).

DETAILED DESCRIPTION

Various implementations of this disclosure provide apparatuses and methods for operating an electric vehicle using implementations of a switch controlled battery charging and powering system. The apparatuses and methods disclosed herein may be more efficient and safer than prior art systems. Furthermore, the apparatuses and method disclosed herein may require fewer components and therefore may have less weight or may cost less than prior art systems. Still further, the apparatuses and methods disclosed herein include a first and second battery pack that are alternatively recharged multiple times and alternatively power the electric motor using a first and second switch. The apparatuses and methods disclosed herein may be suitable for long range driving (i.e., driving beyond the cumulative range for each battery pack used in the vehicle) because the systems or methods can recharge the battery banks repeatedly while the vehicle is moving for continued driving.

Although this disclosure makes reference to electric vehicles, which include but is not limited to, cars, motorcycles, tractor trailers, tractors of all sizes, trains, buses, boats, airplanes, and golfcarts, this disclosure is not intended to be limited to electric vehicles.

Figure 1:
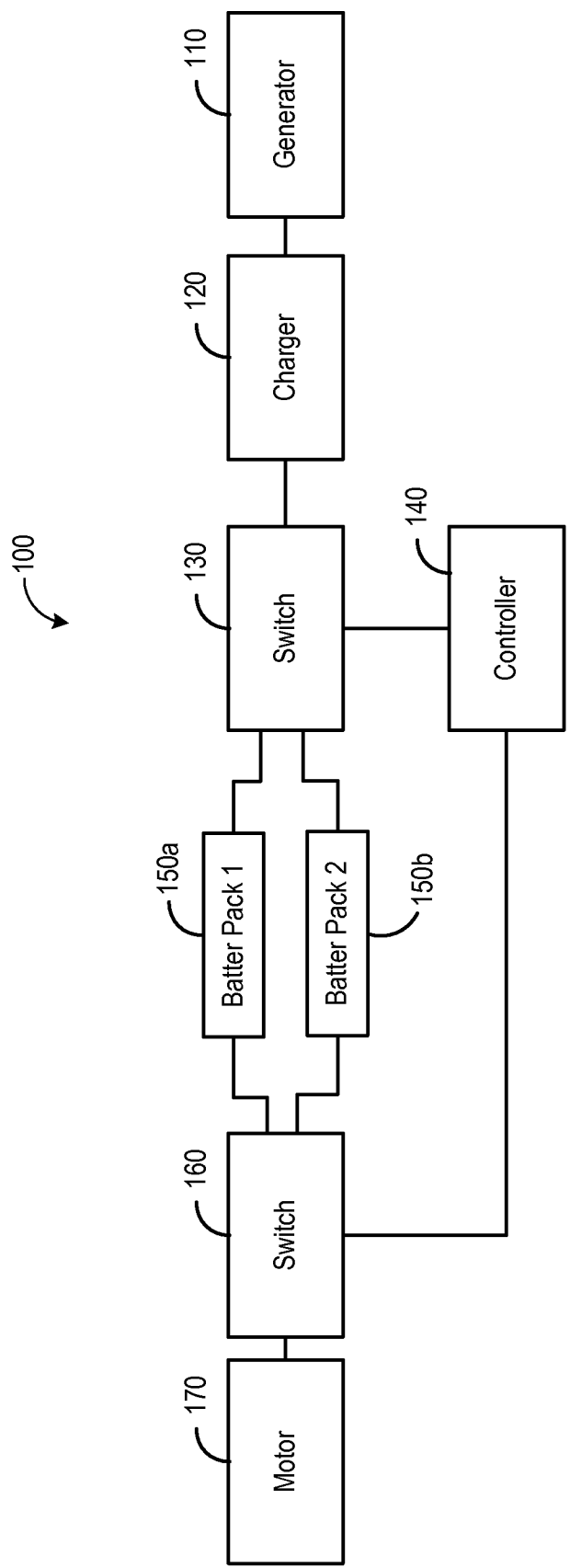
FIG. 1 is a block diagram illustrating an example switch controlled battery charging and powering system for an electric vehicle.
Figure 5:
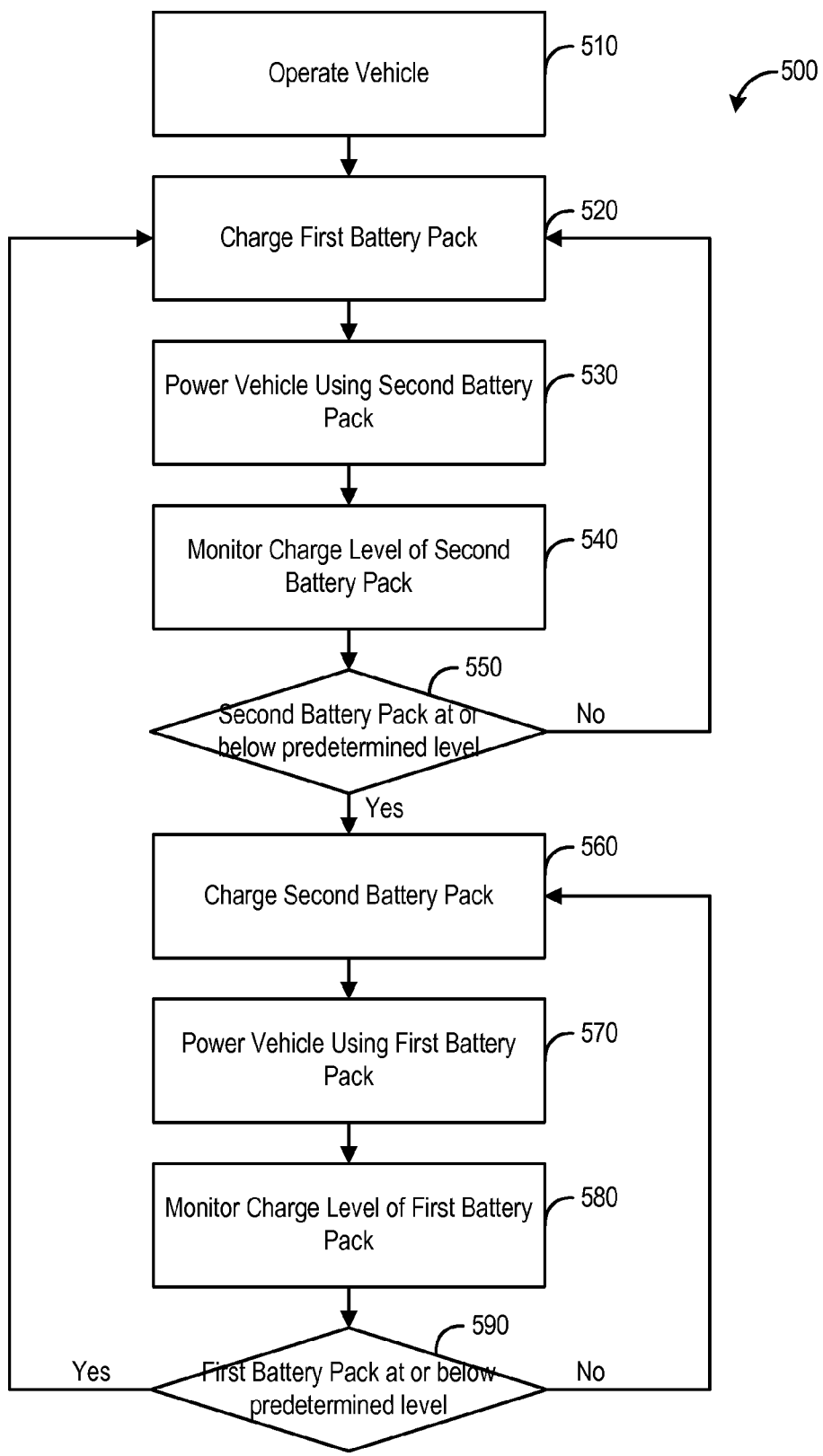
FIG. 5 is a flowchart illustrating an example process for operating a switch controlled battery charging and powering system.

FIG. 1 illustrates an example switch controlled battery charging and powering system 100 for an electric vehicle. The system 100 includes a generator 110, a battery charger 120, a first switch 130 controlled by a controller 140, at least two battery packs 150*a*, 150*b*; a second switch 160 controlled by the controller 140, and a motor 170. FIG. 5 illustrates an example process 500 for operating a switch controlled battery charging and powering system (such as system 100 of FIG. 1).

At stage 510, an electric vehicle containing a switch controlled battery charging and powering system (e.g., the system 100) is in operation and moving. In some implementation, the vehicle is moving for example, at a medium to high speed (e.g., greater than 20 mph) sufficient to operate a generator. While the vehicle is moving, the vehicle supplies mechanical energy to a generator (e.g., generator 110) via one of its moving parts such as a wheel axle (such as the rear wheel axle 280 shown in FIG. 2) or the shaft of the vehicle's motor (such a motor 370 shown in FIG. 3). By connecting the generator to the wheel axle or the shaft of the vehicle's motor, the generator can receive more mechanical energy from the vehicle than a system that connects the generator to the rim of a wheel. Furthermore, by connecting the generator to the wheel axle or the shaft of the vehicle's motor, less friction may be produced between the generator and the wheel axle or the shaft of the vehicle's motor than a system that connects the generator to the rim of a wheel. Thus, the systems of FIGS. 1-3 may be more efficient than a system that connects the generator to the rim of wheel. Still further, connecting the generator to the wheel axle or the shaft of the vehicle's motor may require fewer components than a system that connects the generator to the rim of a wheel via a belt and a V-belt drive wheel pulley. Thus, the systems of FIGS. 1-3 may have less weight than a system that connects the generator to the rim of a wheel thereby increasing the range of a battery pack. Still further, connecting the generator to the wheel axle or the shaft of the vehicle's motor may be safer than a system that connects the generator to the rim of a wheel.

At stage 520, a first battery pack (e.g., battery pack 150*a* of FIG. 1) is charged by the electricity generated by the generator via a charger (e.g. charger 120 of FIG. 1).

At stage 530, a second battery pack (e.g., battery pack 150*b* of FIG. 1) powers the vehicle's motor (e.g., motor 170).

At stage 540, the charge level of the second battery pack is monitored. In some implementations the voltage level of the second battery pack is monitored. The battery charger monitors the charge level. In some implementation, the controller will monitor the voltage level.

At stage 550, it is determined whether the charge level of the second battery pack is at or below a predetermined level. In some implementation, the predetermined charge level is 50%, however, the predetermined charge level can be more or less than 50%. In some implementations, this determination can be made by an on-board processor. If the charge level of the second battery pack is above the predetermined level (i.e., "No" at stage 550), then stages 520 through 540 are repeated until the charge level of the second battery pack is at or below the predetermined level.

Once the charge level of the second battery pack is at or below the predetermined level (i.e., "Yes" at stage 550), then the second battery pack is charged by the electricity generated by the generator, for example, via the charger at stage 560. In some implementations, this can be achieved via a switch (e.g., switch 130 of FIG. 1) controlled via a controller (e.g., controller 140 of FIG. 1). For example, a switch 130 can connect the charger 120 to either the first battery pack 150*a* or the second battery pack 150*b*. The controller 140 can control the switch 130 based on the charge level of the battery pack powering the vehicle. Thus, at stage 520, the controller 140 can cause the switch 130 to connect the first battery pack 150*a* to the generator; then, once the charge level of the second battery pack is at or below a predetermined level, the controller 140 can cause the switch 130 to connect the second battery pack 150*b* to the generator at stage 560.

At stage 570, the first battery pack powers the vehicle's motor. In some implementations, this can be achieved via a switch (e.g., switch 160 of FIG. 1) controlled via a controller (e.g., controller 140 of FIG. 1). For example, a switch 160 can connect the motor 170 to either the first battery pack 150*a* or the second battery pack 150*b*. The controller 140 can control the switch 160 based the position of switch 130. That is, if switch 130 is controlled to connect the second battery pack to the generator, then switch 160 can be controlled to connect the first battery pack to the motor. Alternatively, if switch 130 is controlled to connect the first battery pack to the generator, then switch 160 can be controlled to connect the second battery pack to the motor. In this why, when the first battery pack is being charged, the second battery pack is powering the vehicle and when the second battery pack is being charged, the first battery pack is powering the vehicle. Thus, at stage 530, the controller 140 can cause the switch 160 to connect the second battery pack 150*b* to the motor; then, once the charge level of the second battery pack is at or below a predetermined level (i.e., when the second battery pack is being charged), the controller 140 can cause the switch 160 to connect the first battery pack 150*a* to the motor at stage 570.

At stage 580, the charge level of the first battery pack is monitored.

At stage 590, it is determined whether the charge level of the first battery pack is at or below a predetermined level. In some implementations, this determination can be made by an on-board processor. If the charge level of the first battery pack is above the predetermined level (i.e., "No" at stage 590), then stages 560 through 580 are repeated until the charge level of the first battery pack is at or below a predetermined level.

Once the charge level of the first battery pack is at or below the predetermined level (i.e., "Yes" at stage 590), then stage 520 is repeated where the first battery pack is charged by the electricity generated by the generator, for example, via the charger.

The above process can be repeated while the car is moving. In this way, the vehicle incorporating the system 100 or method 500 may be suitable for long range driving (i.e., driving beyond the cumulative range for each battery pack used in the vehicle) because the system 100 or method 500 can recharge the battery banks repeatedly while the vehicle is moving for continued driving.

Figure 2:
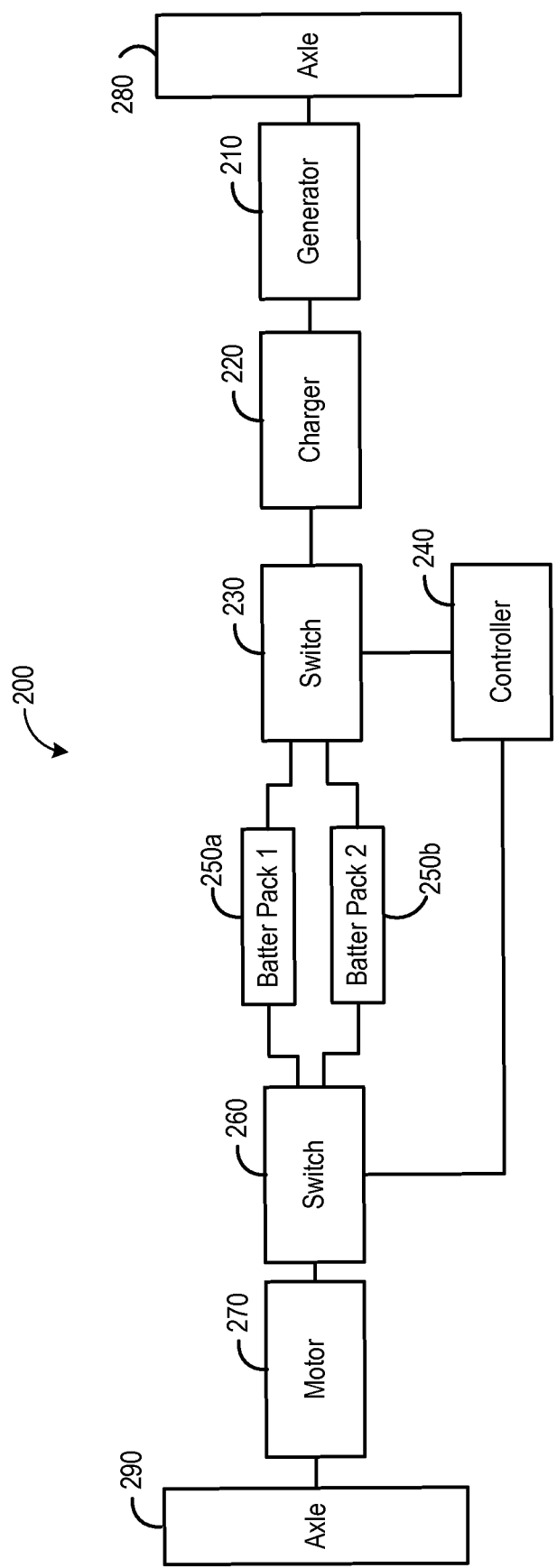
FIGS. 2 and 3 illustrate more detailed implementations of the example switch controlled battery charging and powering system of FIG. 1.
Figure 3:
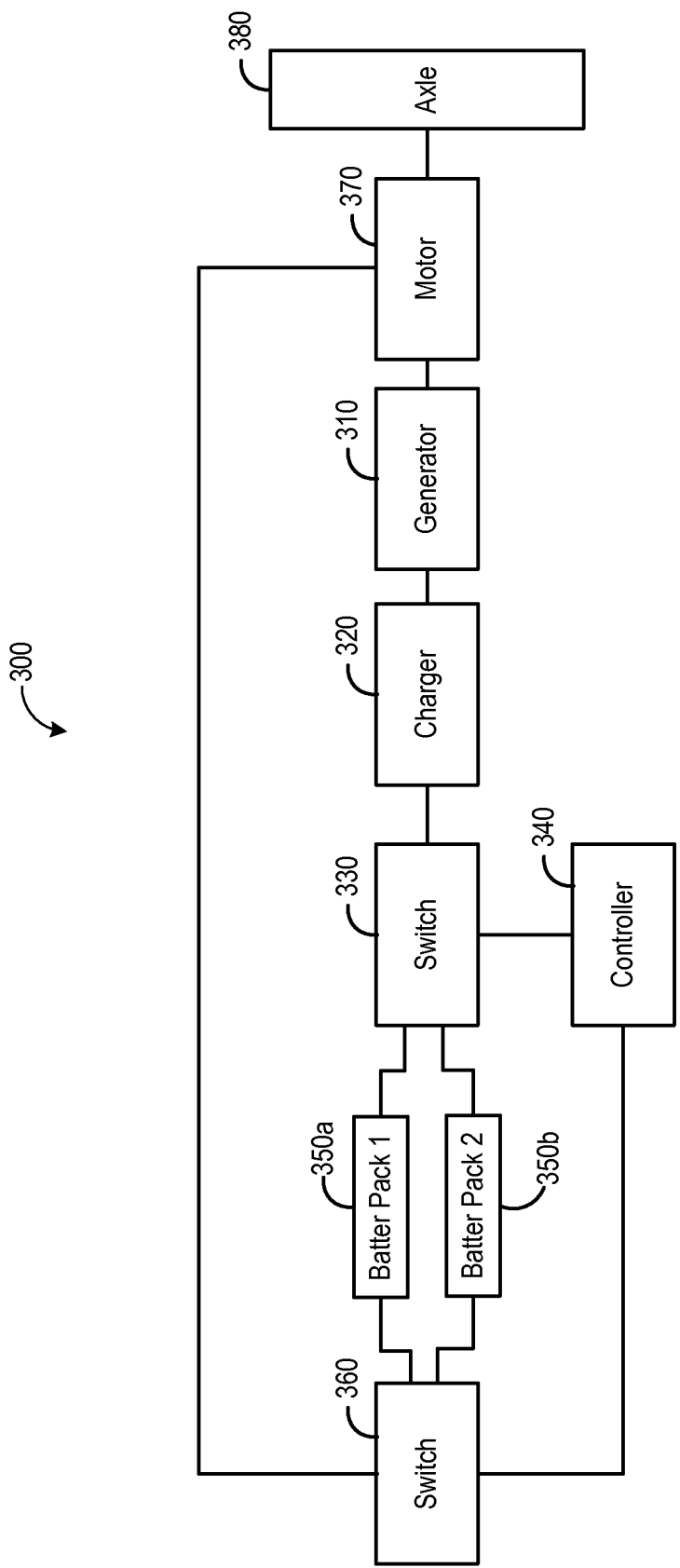

FIGS. 2 and 3 illustrate more detailed implementations of the system 100 of FIG. 1. In FIG. 2, the generator 210 is operatively connected to the axle 280 (e.g., the rear axle) of the vehicle (e.g., via a fitted flange and a cross-member in some implementations) while the motor 270 is connected to the other axle 290 (e.g., the front axle) of the vehicle. In this way, the rotation of the generator shaft can be same or nearly the same as the rotation of the axle 280.

The system 300 of FIG. 3 uses a dual shaft motor 370 where the shaft of the generator 310 is operatively connected to the shaft of the motor 370 on one side and the wheel axle of the vehicle is operatively connected to the shaft of the motor 370 on the other side. In this way, the rotation of the generator shaft can be same or nearly the same as the rotation of the shaft of the motor 370.

Figure 4:
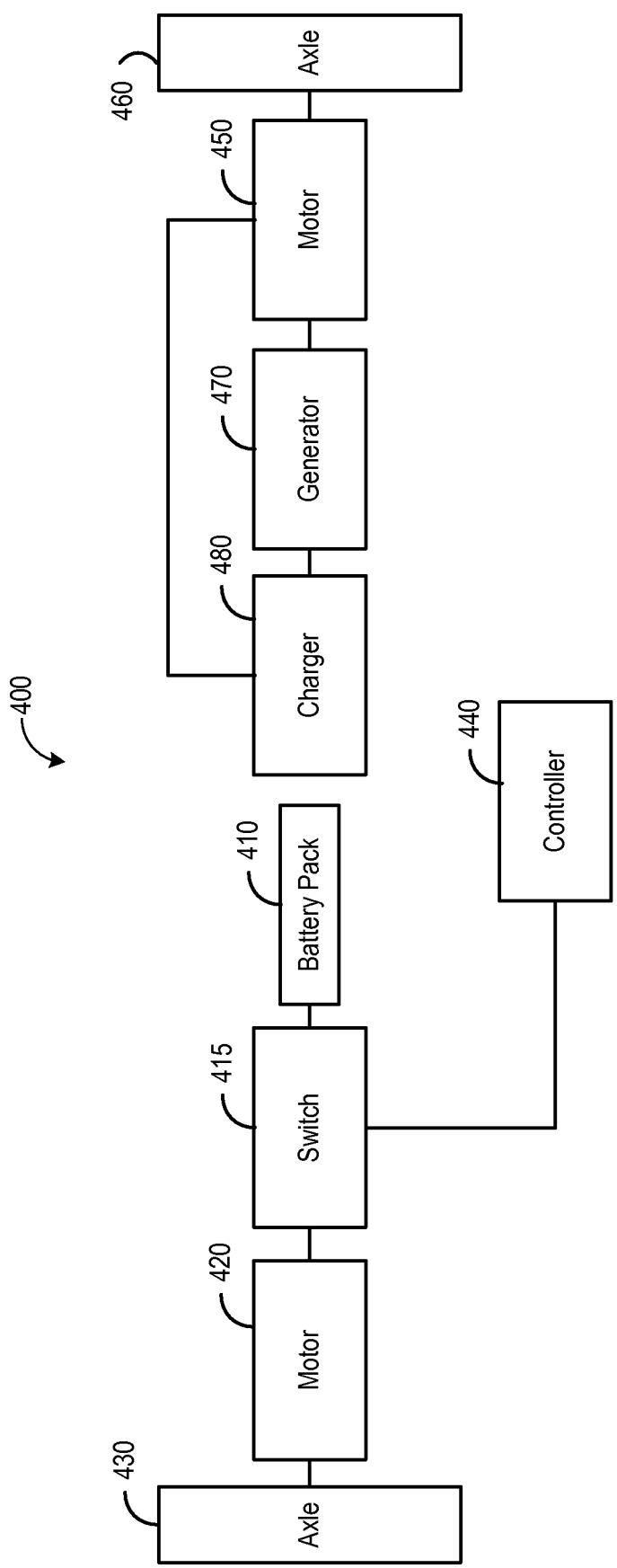
FIG. 4 illustrates another example switch controlled battery charging and powering system for an electric vehicle.
Figure 6:
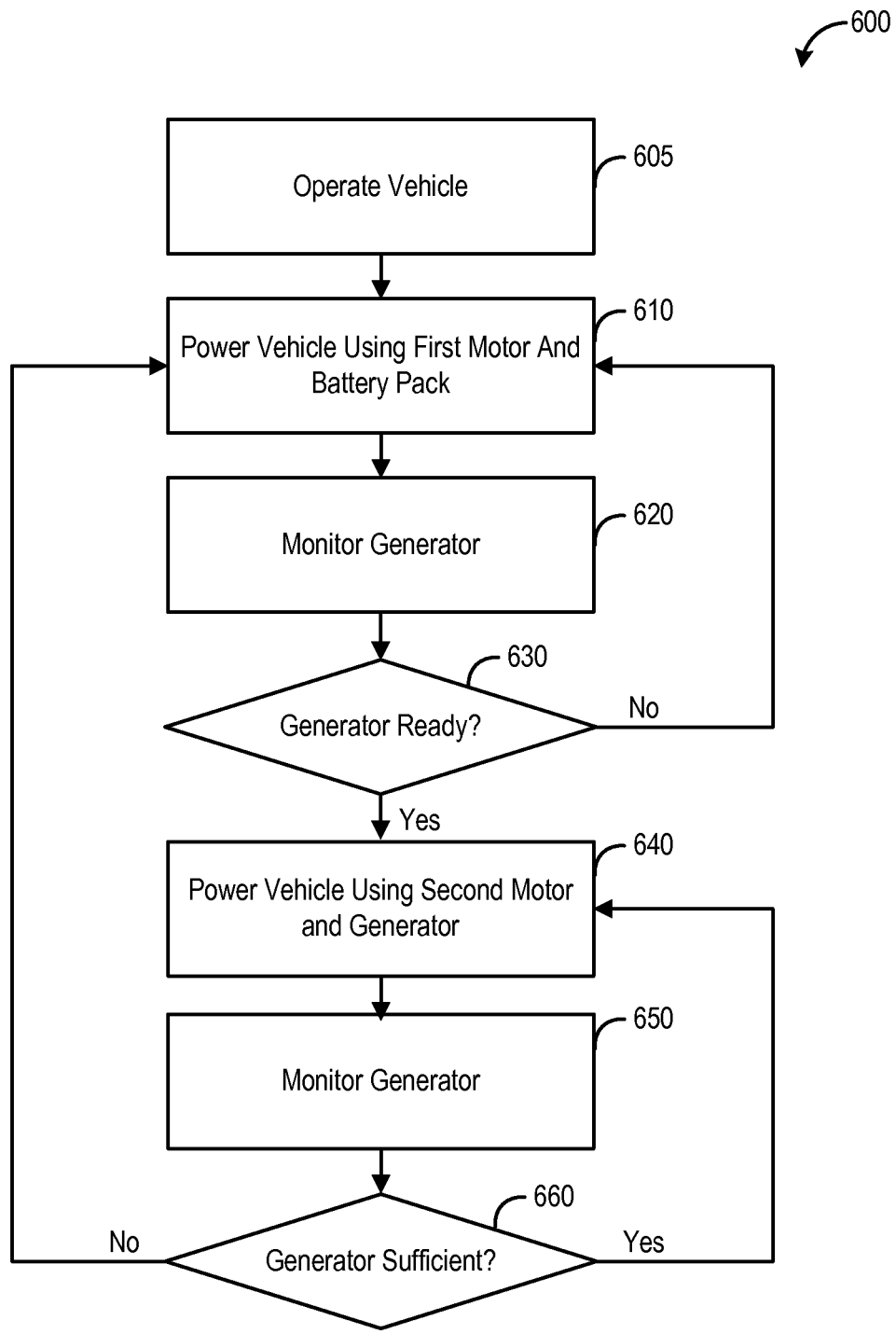
FIG. 6 is a flowchart illustrating another example process for operating a switch controlled battery charging and powering system.

FIG. 4 illustrates another example switch controlled battery charging and powering system 400 for an electric vehicle. The system 400 includes a battery pack 410, a switch 415, a first motor 420, a first wheel axle 430, a controller 440, a second motor 450, a second wheel axle 460, a generator 470, and a charger 480. FIG. 6 illustrates another example process 600 for operating the example switch controlled battery charging and powering system (such as system 400 of FIG. 4).

At stage 605, an electric vehicle is moving for example, at a low speed (e.g., less than 20 mph) that is not sufficient to operate a generator.

At stage 610, a battery pack (e.g., battery pack 410 of FIG. 4) powers a first motor (e.g., motor 420 of FIG. 4). In some implementations, motor 420 is a DC motor. While the vehicle is moving, the vehicle supplies mechanical energy to a generator (e.g., generator 470 of FIG. 4) via one of its moving parts such as a wheel axle (such as the wheel axle4 460 shown in FIG. 4).

At stage 620, the generator is monitored to determine whether it is generating sufficient power to operate a second motor (e.g., motor 450 of FIG. 4). As the speed of the vehicle increases, the power generated by the generator increases.

At stage 630, it is determined whether the generator is generating sufficient power to operate the second motor. If the generator is not generating sufficient power to operate the second motor (i.e., "No" at stage 630), then stages 610 through 620 are repeated until the generator is generating sufficient power to operate the second motor.

Once the generator is generating sufficient power to operate the second motor (i.e., "Yes" at stage 630), the second motor is powered by the generator and drives the vehicle, at stage 640. In some implementations, this can be achieved via a switch (e.g., switch 415 of FIG. 4) controlled via a controller (e.g., controller 440 of FIG. 4). For example, a switch 415 can connect the first motor 420 to the battery pack 410. The controller 440 can control the switch 415 based on the speed of the vehicle or the amount of power generated by the generator 470. For example, if the speed of the vehicle is at or below a predetermined level or if the amount of power generated by the generator 470 is at or below a predetermined level, the switch 415 can connect the first motor 420 to the battery pack 410. If the speed of the vehicle is above a predetermined level or if the amount of power generated by the generator 470 is above a predetermined level, the switch 415 can disconnect the first motor 420 from the battery pack 410. Thus, at stage 610, the controller 440 can cause the switch 415 to connect the first motor 420 to the battery pack 410; then, once the generator is generating sufficient power to operate the second motor 450, the controller 440 can cause the switch 415 to disconnect the first motor 420 from the battery pack 410 at stage 640. In this way, the second motor 450 is powered by the generator and drives the vehicle. In some implementations, the second motor 450 is an AC motor.

At stage 650, the generator is monitored to determine whether it is generating sufficient power to operate the second motor. As the speed of the vehicle decreases, the power generated by the generator decreases.

At stage 660, it is determined whether the generator is generating sufficient power to operate the second motor. If the generator is generating sufficient power to operate the second motor (i.e., "Yes" at stage 660), then stages 640 through 650 are repeated until the generator is nor generating sufficient power to operate the second motor.

Once the generator is not generating sufficient power to operate the second motor (i.e., "No" at stage 660), stage 610 is repeated where the battery pack powers a first motor.

The above process can be repeated while the car is moving.

Implementations of the devices of this disclosure, and components thereof, can be realized by instructions that upon execution cause one or more processing devices to carry out the processes and functions described above.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A method for operating an electric vehicle, the method comprising:
   operating an electric vehicle at a speed greater than or equal to a predetermined speed;
   using the mechanical power of the moving electric vehicle to operate a generator;
   connecting a first battery pack to the generator and charging the first battery pack using the generator while the electric vehicle is operating at a speed equal to or greater than the predetermined speed;

powering a motor using a second battery pack when the first second battery pack is connected to generator;

monitoring the charge level of the second battery pack when the second battery pack is powering the motor;

when the charge level of the second battery pack is at or below a predetermined charge level, disconnecting the first battery pack from the generator and connecting the second battery pack to the generator and charging the second battery pack using the generator while the electric vehicle is operating at a speed equal to or greater than the predetermined speed;

powering the motor using the first battery pack when the second battery pack is connected to generator;

monitoring the charge level of the first battery pack when the first battery pack is powering the motor; and when the charge level of the first battery pack is at or below the predetermined charge level, disconnecting the second battery pack from the generator and connecting the first battery pack to the generator and charging the first battery pack using the generator while the electric vehicle is operating at a speed equal to or greater than the predetermined speed.

2. The method of claim 1 wherein the predetermined speed is greater than or equal of 20 mph.

3. The method of claim 1 wherein using the mechanical power of a moving vehicle to operate a generator comprising operatively connecting the shaft of the motor to the shaft of the generator.

4. The method of claim 1 wherein using the mechanical power of a moving vehicle to operate a generator comprising operatively connecting the shaft of the generator to a wheel axle.

5. The method of claim 1 wherein the predetermined charge level is 50%.

6. An electric vehicle comprising:
a generator;
a battery charger operatively connected to the generator;
a first battery pack and a second battery pack;
a motor;
a monitor configured to monitor the charge level of the first battery pack when the first battery pack is powering the motor and configured to monitor the charge level of the second battery pack when the second battery pack is powering the motor;
a first switch; and
a second switch, wherein:
the first switch is configured to connect the first battery pack to the battery changer to charge the first battery pack using the generator while the electric vehicle is operating at a speed equal to or greater than the predetermined speed until the charge level of the second battery pack is at or below a predetermined charge level and then connect the second battery pack to the battery changer to charge the second battery pack using the generator while the electric vehicle is operating at a speed equal to or greater than the predetermined speed; and
the second switch is configured to connect the motor to the second battery pack when the first switch connects the first battery pack to the battery charger and configured to connect the motor to the first battery pack when the first switch connects the second battery pack to the battery charger.

7. The electric vehicle of claim 6 wherein the predetermined charging level is 50%.

8. The electric vehicle of claim 6 wherein the shaft of the generator is operatively connected to the shaft of the motor.

9. The electric vehicle of claim 6 wherein the shaft of the generator is operatively connected to a wheel axle.

* * * * *